(12) United States Patent
Tesauro et al.

(10) Patent No.: US 7,599,898 B2
(45) Date of Patent: Oct. 6, 2009

(54) METHOD AND APPARATUS FOR IMPROVED REGRESSION MODELING

(75) Inventors: Gerald J. Tesauro, Croton-on-Hudson, NY (US); Kilian Q. Weinberger, Philadelphia, PA (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 11/550,192

(22) Filed: Oct. 17, 2006

(65) Prior Publication Data
US 2008/0154817 A1 Jun. 26, 2008

(51) Int. Cl.
G06E 1/00 (2006.01)
G06E 3/00 (2006.01)
G06F 15/18 (2006.01)
G06G 7/00 (2006.01)

(52) U.S. Cl. ........................................ 706/17
(58) Field of Classification Search ............ 706/17
See application file for complete search history.

(56) References Cited

U.S. PATENT DOCUMENTS

| | | | |
|---|---|---|---|
| 5,754,681 A | | 5/1998 | Watanabe et al. |
| 6,295,509 B1 * | | 9/2001 | Driskell ............... 702/182 |
| 6,353,814 B1 * | | 3/2002 | Weng ................... 706/12 |
| 6,939,670 B2 * | | 9/2005 | Pressman et al. ........... 435/4 |
| 7,020,631 B2 * | | 3/2006 | Freeman et al. ........ 705/36 R |
| 7,165,037 B2 * | | 1/2007 | Lazarus et al. ............. 705/10 |
| 7,214,485 B2 * | | 5/2007 | Belinsky et al. ............. 435/6 |
| 7,260,551 B2 * | | 8/2007 | Phillips ................. 705/10 |
| 7,263,492 B1 * | | 8/2007 | Suresh et al. .............. 705/2 |
| 7,263,506 B2 * | | 8/2007 | Lee et al. ................ 705/38 |
| 7,363,308 B2 * | | 4/2008 | Dillon et al. ............ 707/101 |
| 7,373,256 B2 * | | 5/2008 | Nicholson et al. .......... 702/19 |
| 7,376,618 B1 * | | 5/2008 | Anderson et al. .......... 705/38 |
| 7,436,511 B2 * | | 10/2008 | Ruchti et al. ............. 356/326 |
| 7,451,065 B2 * | | 11/2008 | Pednault et al. ............ 703/2 |
| 7,512,508 B2 * | | 3/2009 | Rajski et al. ............. 702/118 |

OTHER PUBLICATIONS

A regression approach to equivalent bandwidth characterization in ATM networks Ramaswamy, S.; Ono-Tesfaye, T.; Gburzyuski, P.; Modeling, Analysis, and Simulation of Computer and Telecommunication Systems, 1997. MASCOTS '97., Proceedings Fifth International Symposium on Jan. 12-15, 1997 pp. 104-109 Digital Object Identifier 10.1109/MASCOT.1997.*

(Continued)

Primary Examiner—Michael B Holmes

(57) ABSTRACT

The present invention is a method and an apparatus for improved regression modeling to address the curse of dimensionality, for example for use in data analysis tasks. In one embodiment, a method for analyzing data includes receiving a set of exemplars, where at least two of the exemplars include an input pattern (i.e., a point in an input space) and at least one of the exemplars includes a target value associated with the input pattern. A function approximator and a distance metric are then initialized, where the distance metric computes a distance between points in the input space, and the distance metric is adjusted such that an accuracy measure of the function approximator on the set of exemplars is improved.

35 Claims, 3 Drawing Sheets

OTHER PUBLICATIONS

Combining Landsat ETM+ and terrain data for scaling up leaf area index (LAI) in eastern Amazon: an intercomparison with MODIS product Shimabukuro, Y.E.; Aragao, L.E.O.C.; Espirito-Santo, F.D.B.; Williams, M.; Geoscience and Remote Sensing Symposium, 2004. IGARSS '04. Proceedings. 2004 IEEE International vol. 3, Sep. 20-24, 2004 pp. 2050-2053.*

An intelligent system for financial time series prediction combining dynamical systems theory, fractal theory, and statistical methods Castillo, O.; Melin, P.; Computational Intelligence for Financial Engineering, 1995.,Proceedings of the IEEE/IAFE 1995 Apr. 9-11, 1995 pp. 151-155 Digital Object Identifier 10.1109/CIFER.1995.495269.*

International Search Report and Written Opinion for PCT/US2007/078377, copy consists of 16 unnumbered pages.

Jacob Goldberger, et al., "Neighbourhood Compenents Analysis", Internet Citation, [Online] 2004, XP007903888, Retrieved from the internet: URL:http://www.cs.toronto.edu/{hinton/absps/nca.pdf> [retrieved on Jan. 21, 2008].

Aha D W, "Tolerating noisy, irrelevant and novel attributes in instance-based learning algorithms", International Journal of Man—Machine Studies, Academic Press, London, GB, vol. 36, 1992, pp. 267-287, XP007903847 ISSN: 0020-7373, Section 4: "Tolerating attributes with uncertain tolerance", in particular, subsection 4.2: "IB4: Learning attribute relevance".

Fukunaga, Keinosuke, "Introduction to Statistical Pattern Recognition, Chapter 6 (p. 254-299)", 1990, Academic Press, Inc., Boston 207370, XP002466163.

Weinberger, Kilian Q., Tesauro, Gerald, "Metric Learning for Kernel Regression", Proceedings of the 11$^{th}$ International Conference on Artifical Intellegence and Statistics, [Online] Mar. 21, 2007-Mar. 24, 2007, XP007903848 Online ISBN: 0-9727358-2-8, Retrieved from the Internet: URL:http://www.stat.umn.edu/{aistat/proceedings/data/papers/077.pdf> [retrieved on Jan. 21, 2007.

Shental, Noam; Hertz, Tomer; Weinshall, Daphna; Pavel, Misha, "Adjustment Learning and Relevant Component Analysis", Proceedings of ECCV, [Online] Jun. 2002, XP007903913, Copenhagen, DK, Retrieved from the Internet: URL:http://citeseer.ist.psu.edu/cache/papers/cs/26471/http:zSzzSzleibniz.cs.huji.ac.ilzSztrzSzacczSz2002zSzHUJI-CSE-LTR-2002-16_paper_CR01.pdf/shental02adjustment.pdf> [retrieved on Jan. 24, 2008].

Scott Cost, et al., "A Weighted Nearest Neighbor Algorithm for Learning with Symobolic Features", Machine Learning, Kluwer Academic Publishers—Plenum Publishers, NE, vol. 10, No. 1, Jan. 1, 1993, pp. 57-78, XP019213229 ISSN: 1573-0565.

Lowe D G, "Similarity Metric Learning for A Variable-Kernel Classifier", Internet Citation, [Online] Nov. 25, 1993, XP007903889, retrieved from the Internet: http://citeseer.ist.psu.edu/cache/papers/cs/286/http:zSzzSzwww.cs.ubc.cazSzspiderzSzlowezSzpaperszSzneural95.pdf/lowe95similarity.pdf> [retrieved on Jan. 21, 2008].

* cited by examiner

METHOD AND APPARATUS FOR IMPROVED REGRESSION MODELING

BACKGROUND

The invention relates generally to data analysis, and relates more particularly to data analysis techniques using nonlinear regression.

Nonlinear regression refers to the development of empirical models often used in data analysis to encapsulate temporal and/or structural relationships between observed quantities ("input variables") and quantities of interest ("output variables" or "target variables"), which may be difficult to observe directly. Specifically, the goal of nonlinear regression is to construct a mathematical model that is capable of accurately estimating an unobserved target variable as a function of the settings of the collection of input variables to particular input states or patterns.

Typically, these mathematical models are produced by applying machine learning or training techniques to a data set that contains a number of historical exemplars, where each exemplar i comprises a particular input pattern $\vec{x}_i$ (with each of the input variables set to a particular value) and an associated target value $y_i$ that was observed or known by some means. Training on the data set aims to obtain a general functional mapping $\hat{y}=F(\vec{x})$ that estimates a predicted or likely target value $\hat{y}$ for a general input pattern $\vec{x}$. A desirable property of the mapping is that it is general enough to provide accurate target value estimates for input patterns not contained in the training data set.

Existing techniques for performing nonlinear regression (including neural networks, regression trees, splines, wavelets, and support vector regression, among others) commonly suffer from a limitation referred to as the curse of dimensionality. That is, it becomes progressively (e.g., exponentially) more difficult to learn an accurate functional mapping as the dimensionality (number of features or state variables) of the input space increases.

Thus, there is a need for an improved method for regression modeling that addresses the curse of dimensionality which limits existing methods.

SUMMARY OF THE INVENTION

The present invention is a method and an apparatus for improved regression modeling to address the curse of dimensionality, for example for use in data analysis tasks. In one embodiment, a method for analyzing data includes receiving a set of exemplars, where at least two of the exemplars include an input pattern (i.e., a point in an input space) and at least one of the exemplars includes a target value associated with the input pattern. A function approximator and a distance metric are then initialized, where the distance metric computes a distance between points in the input space, and the distance metric is adjusted such that an accuracy measure of the function approximator on the set of exemplars is improved.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for improved regression modeling to address the curse of dimensionality. Embodiments of a present invention simultaneously learn a distance metric (between points in an input space) and a distance-based function approximator. These quantities are broadly useful for purposes of estimation, prediction and control throughout many areas of science and engineering, including, but not limited to, systems management, medical science, pharmacology, bioinformatics, geophysical and atmospheric sciences, financial and economic modeling and consumer/customer modeling.

Figure 1:
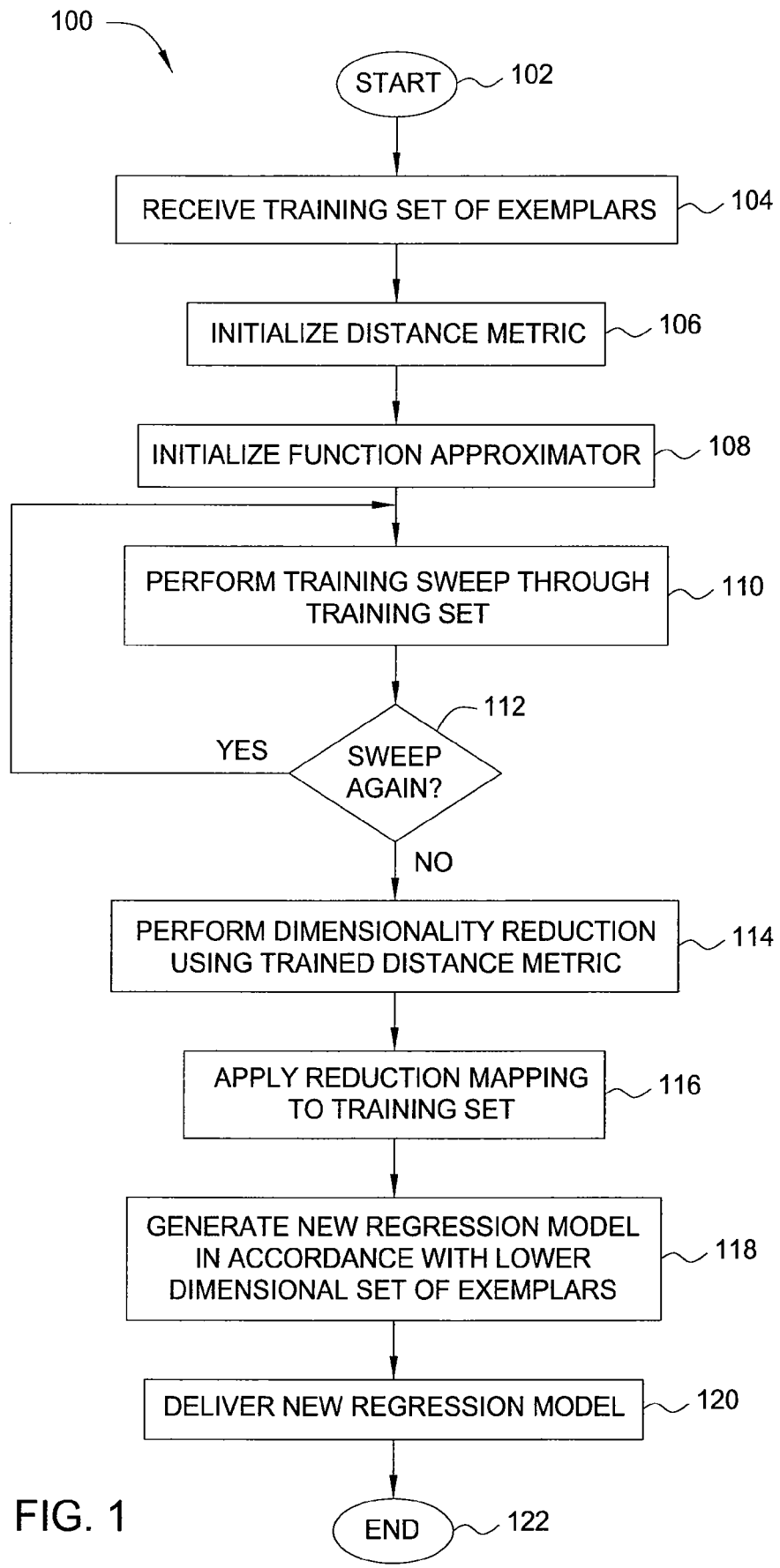
FIG. 1 is a flow diagram illustrating one embodiment of a method for regression modeling, according to the present invention.

FIG. 1 is a flow diagram illustrating one embodiment of a method 100 for regression modeling, according to the present invention. The method 100 may be implemented, for example, to perform a data analysis task.

The method 100 is initialized at step 102 and proceeds to step 104, where the method 100 receives a training set of S exemplars. At least two of the exemplars i in the training set comprise an input pattern $\vec{x}_i$ (i.e., a point in an N-dimensional input space), and at least one of the exemplars comprises a target value $y_i$ (e.g., a scalar value) associated with the input pattern $\vec{x}_i$.

At step 106, the method 100 initializes a distance metric $D(\vec{x}, \vec{x}')$. The distance metric is a global function for computing a distance between general points $\vec{x}$ and $\vec{x}'$ in the input space. In one embodiment, the distance metric takes the form of a Mahalanobis distance:

$$D(\vec{x}, \vec{x}') = \sqrt{\Sigma_{i,j} M_{ij}(x_i - x'_i)(x_j - x'_j)} \qquad \text{(EQN. 1)}$$

where $M_{ij}$ denotes the elements of a positive semi-definite matrix M. In this case, initialization of the distance metric comprises setting initial values of $M_{ij}$. In one embodiment, any one of a number of initialization schemes may be implemented to initialize the elements of $M_{ij}$, including setting the elements of $M_{ij}$ to random values or to values corresponding to an identity matrix. In another embodiment, initial values $L_{ij}$ of elements of a linear transformation matrix L are provided, where the matrix L relates to the matrix M according to:

$$M = L \cdot L^T \qquad \text{(EQN. 2)}$$

with $L^T$ denoting the transpose of the matrix L.

In step 108, the method 100 initializes a function approximator $F(\vec{x})$. In one embodiment, the function approximator is a distance-based nonlinear function approximator. In a further embodiment, the function approximator is governed by a set of k distances $\{d_1, d_2, \ldots, d_k\}$ between $\vec{x}$ and a set of k reference points $\{\vec{x}_1, \vec{x}_2, \ldots \vec{x}_k\}$. In this case, initialization of the function approximator comprises setting the number and locations of the reference points, as well as setting the initial distance function $D(\vec{x}, \vec{x}')$ in step 104.

In a further embodiment still, the number (k) of reference points equals the number of exemplars (S) in the training set. In this case, the locations of the reference points coincide with the locations of the input exemplars. Additionally, the function approximator comprises a normalized sum of Radial Basis Functions, i.e.:

$$F(\vec{x}) = \sum_{j=1}^{S} \frac{w_j(\vec{x}) * y_j}{\Omega(\vec{x})} \quad \text{(EQN. 3)}$$

where $y_j$ is the target output value for exemplar j, $$w_j(\vec{x}) = \exp(-d_j(\vec{x})) \quad \text{(EQN. 4)}$$

with $$d_j(\vec{x}) = D^2(\vec{x}, \vec{x}_j) \quad \text{(EQN. 5)}$$

and $$\Omega(\vec{x}) = \sum_{j=1}^{S} w_j(\vec{x}) \quad \text{(EQN. 6)}$$

In yet another embodiment, the function approximator comprises additional adjustable structure or parameters θ. In this case, initialization of the function approximator further comprises an initialization of θ in accordance with established methods in the art. For example, if the function approximator is based on neural networks with adjustable weight values, initialization of the function approximator might comprise initializing the weight values in accordance with standard methods (e.g., randomly).

Figure 2:
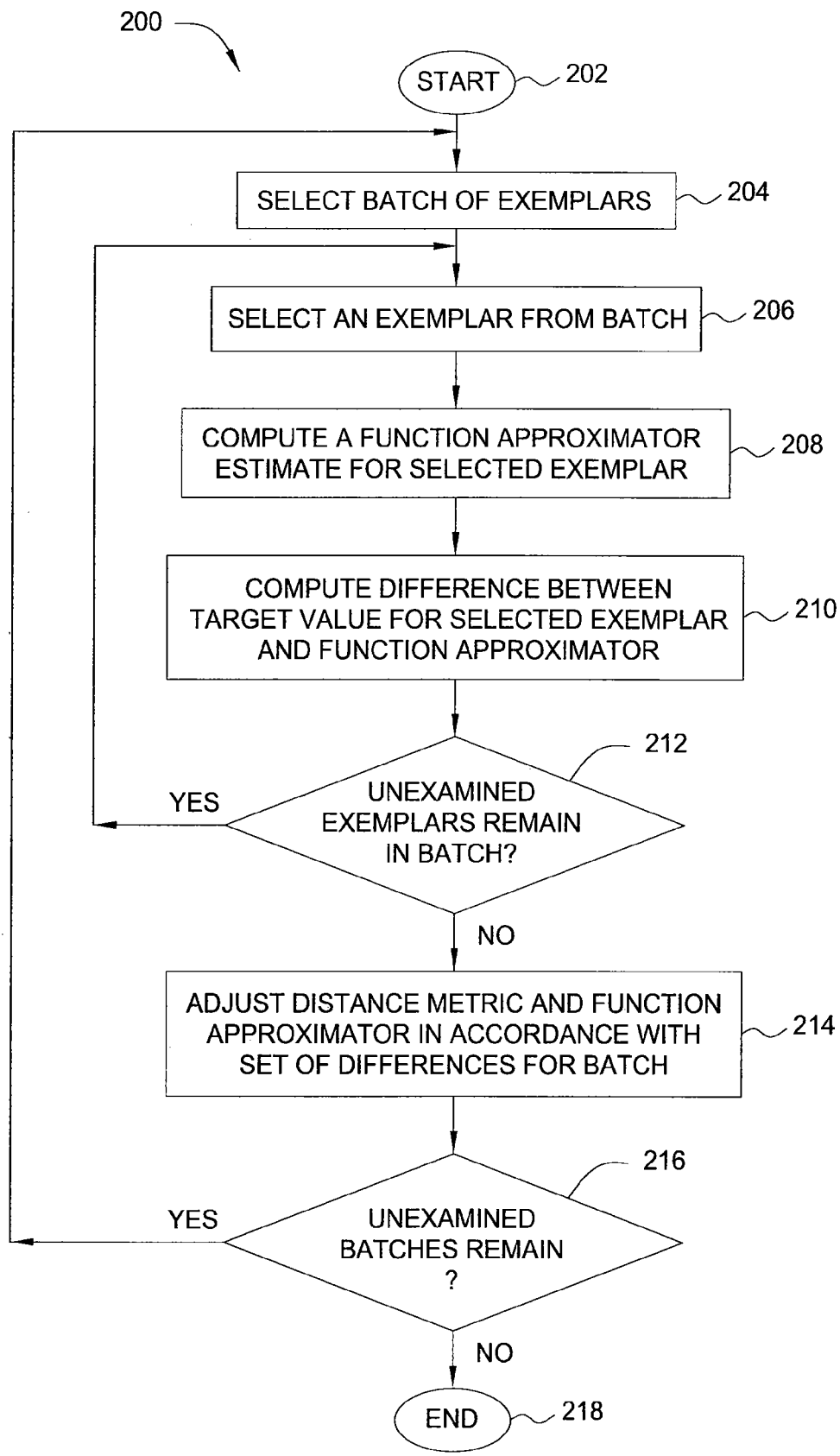
FIG. 2 is a flow diagram illustrating one embodiment of a method for training on a batch of exemplars.

In step 110, the method 100 performs a training sweep through the training set of exemplars. In one embodiment, a training sweep comprises training on batches (i.e., subsets) of the exemplars. In one embodiment, the size of a batch for training sweep purposes ranges from a single exemplar to the entire set of exemplars. In one embodiment, training on a batch of exemplars is performed in accordance with a method described in greater detail with respect to FIG. 2. In one embodiment, the sweep through the exemplars is performed in a random order. In an alternate embodiment, the sweep through the exemplars is performed in a defined sequential order. The output of the training sweep is a trained function approximator F( ) and a trained distance metric D( ). The primary goal of the training sweep(s), as described in greater detail with respect to FIG. 2, is to progressively adjust the parameters encoding the distance function (e.g., the matrix elements encoding a Mahalanobis distance), as well as any adjustable structure or parameters θ of the function approximator, such that an error measure of the function approximator on the set of exemplars is minimized. The training sweep may also incorporate established statistical methods (e.g., regularization methods) aimed at reducing the occurrence of overfitting, as also described in greater detail with respect to FIG. 2.

In step 112, the method 100 determines whether another training sweep should be performed through the training set of exemplars. In one embodiment, the method 100 performs another training sweep if a termination criterion (i.e., a criterion dictating when to terminate training) has not been met. In one embodiment, the termination criterion is met if the total error E over the entire training set of exemplars falls below a predefined threshold value. In another embodiment, the termination criterion is met if a rate of decrease of the total error E per training sweep reaches a predefined threshold value. In another embodiment still, the termination criterion is met if an upper bound on a total number of training sweeps is met.

In yet another embodiment, the termination criterion is based on one or more established "early stopping" methods to avoid overfitting (i.e., learning a model that performs well on the training data, but generalizes poorly to additional data not seen during the training process). For example, training may be terminated at the point at which the "cross-validation error" (i.e., average error on holdout data over a number of runs in which the data is randomly partitioned into training data and holdout data) is minimized.

If the method 100 concludes in step 112 that another training sweep should be performed, the method 100 returns to step 110 and proceeds as described above to perform another training sweep.

Alternatively, if the method 100 concludes in step 112 that another training sweep should not be performed, the method 100 proceeds to step 114 and performs dimensionality reduction using the trained distance metric produced in step 110 and the training set of exemplars. The output of the dimensionality reduction application is a reduction mapping $\vec{z} = R(\vec{x})$. The reduction mapping transforms a general input vector $\vec{x}$ into a lower-dimensional vector $\vec{z}$.

In one embodiment, where the trained distance metric D( ) comprises a Mahalanobis distance expressed by a linear transformation matrix L, a linear reduction mapping R( ) can be obtained that is based directly on the linear transformation matrix. In one embodiment, the matrix L that is output by step 110 is already of low rank, due to constrained or unconstrained error minimization performed in step 110. In this case, the linear reduction mapping R( ) may consist simply of multiplication by L, i.e., $\vec{z} = L \cdot (\vec{x})$.

In another embodiment, the trained distance metric is applied to a plurality of input exemplar pairs $(\vec{x}_i, \vec{x}_j)$ in order to obtain an in-sample set of pairwise distances $\{d_{ij}\}$. Nonlinear Dimensionality Reduction is then applied to the set of pairwise distances, in accordance with any one or more of a number of known techniques (e.g., Isomap, Laplacian Eigenmaps, Maximum Variance Unfolding, etc.). This produces a low-dimensional in-sample embedding $\{\vec{z}_i\}$ of the input exemplars $\{\vec{x}_i\}$. The method 100 then applies to the in-sample embedding any one or more of a number of known techniques for constructing a general out-of-sample embedding $\vec{z} = R(\vec{x})$, such as Local Linear Embedding.

In step 116, the method 100 obtains a lower dimensional set of exemplars $\{(\vec{z}_i, y_i)\}$ from the original training set of exemplars $\{(\vec{x}_i, y_i)\}$. In one embodiment, the lower dimensional set of exemplars is obtained directly from the in-sample embedding $\{\vec{z}_i\}$. In an alternate embodiment, the method 100 applies the reduction mapping R( ) produced in step 114 to the training set of exemplars $\{(\vec{x}_i, y_i)\}$ in step 116. In some embodiments, delivery of the lower dimensional set of exemplars $\{(\vec{z}_i, y_i)\}$ may be useful for purposes of interpretation and understanding by a human data analyst. For example, plots or visualizations of the lower dimensional exemplars may be feasible and interpretable, whereas such plots or visualizations may be entirely infeasible if the original training set of exemplars $\{(\vec{x}_i, y_i)\}$ is of sufficiently high dimensionality.

In step 118, the method 100 generates a new regression model G( ) in accordance with the lower dimensional set of exemplars $\{(\vec{z}_i, y_i)\}$. In one embodiment, this is accomplished by performing standard nonlinear regression, for example in accordance with any one or more known techniques, in order to produce the new regression model $\tilde{y}=G(\vec{z})$. The new regression model estimates a target value $\tilde{y}$ for a general reduced dimensional input vector $\vec{z}$.

In step 120, the method 100 delivers the new regression model G( ) and the reduction mapping R( ) to an application. The application may use the new regression model G( ) and the reduction mapping R( ), for example, in combination for the purposes of estimation, prediction or control (e.g., given input vectors $\vec{x}$ in the original input space). For instance, the reduction mapping $R(\vec{x})$ may be applied to obtain a lower dimensional input vector $\vec{z}$, and the regression model $G(\vec{z})$ may then be applied to obtain an estimated target value.

The method 100 then terminates in step 122.

In an alternative embodiment, the method 100 may skip the dimensionality reduction (i.e., steps 114-118) and proceed from step 112 (i.e., the training sweeps) directly to step 120 to deliver the function approximator F( ) along with the learned distance metric D( ).

The method 100 thus automatically learns a distance metric between points in the input space. Such distance metrics are typically unavailable or ill-defined in many regression datasets, especially when the various features in the input space represent completely different types of quantities. The distance metric may provide the basis for dimensionality reduction of an input space in many applications. Moreover, the method 100 simultaneously learns a distance-based function approximator, which may also be implemented in many applications.

For example, the method 100 may be implemented in the field of systems management, where the input patterns comprise measurements of various quantities that describe the state of a distributed computing system (e.g., workload levels, queue lengths, response times and throughput measures, central processing unit and memory utilizations, etc.) and/or data that describes management actions (e.g., allocated resource levels, control parameter/configuration settings, etc.). In this case, the target values (output) may represent an expected value of an overall multi-criteria utility function that expresses how well the system is performing with respect to a set of system management objectives.

Alternatively, the method 100 may be implemented in the field of medical data analysis. In this case, the input patterns might comprise measurements or test results pertaining to cancer patients, and the target values may comprise life expectancy estimates associated with particular types of treatments of therapies. An accurate regression model could help a physician decide upon the type of treatment most likely to be effective for a particular patient.

The method 100 could also be implemented in the field of pharmacology/bioinformatics. In this case, the input patterns could comprise features that describe primary, secondary and tertiary structures of proteins, while the target values could represent estimated affinities or binding energies to particular types of receptors. An accurate regression model could assist in drug design and development, by prescreening a large number of candidate molecules and selecting a small number of candidates with highest expected affinities for in vitro or in vivo testing.

In addition, the method 100 could be implemented in the fields of marine/geophysical/atmospheric sciences. In this case, the input patterns might comprise signal data that results from acoustic or gamma densitometer probes of porous rock formations, while the target values might represent expected densities of oil or oil/water/natural gas fractions. An accurate regression model would be useful in searching for oil, natural gas and other types of natural resources. Alternatively, the input patterns may comprise climatic or ecological data such as temperature, carbon dioxide levels, or population levels of various aquatic species, while the target values might represent future sea levels, temperatures, or animal population levels. An accurate regression model may be useful in forecasting sea level changes, or weather or climate changes, particularly in relation to human activities such as carbon dioxide emissions or depletion of various fish species.

The method 100 may also be implemented in the field of financial/economic modeling. In this case, the input patterns might comprise readings at particular points of time of econometric variables (e.g., inflation, gross domestic product growth, interest rates, corporate debt levels, etc.), while the target values might represent predictions of future quantities (e.g., inflation, interest rates, equity prices, etc.). An accurate regression model would be useful in making economic forecasts, in portfolio management or in trading in various financial markets.

Additionally, the method 100 may be implemented in the field of consumer/customer modeling. In this case, the input patterns could comprise data pertaining to individual consumers (e.g., age, annual income, historical spending and debt payment patterns, etc.), while the target values could represent expected spending in response to particular promotional campaigns or expected delinquency in repaying a given level of credit card debt. An accurate regression model would be useful in targeted marketing or in approval of credit card purchases.

FIG. 2 is a flow diagram illustrating one embodiment of a method 200 for training on a batch of exemplars. The method 200 may be implemented, for example, in order to perform a training sweep on a training set of exemplars as described with regard to step 110 of the method 100.

The method 200 is initialized at step 202 and proceeds to step 204, where the method 200 selects a batch of exemplars for processing. The method 200 then proceeds to step 206 and selects an exemplar i from the selected batch. In step 208, the method 200 computes a function approximator estimate $\hat{y}_i = F(\vec{x}_i)$ for the selected exemplar.

In step 210, the method 200 computes a difference between a recorded target (output) value $y_i$ for the selected exemplar and the function approximator estimate $\hat{y}_i$. The method 200 then proceeds to step 212 and determines whether there are any unexamined exemplars remaining in the batch (i.e., any exemplars for whom a function approximator estimate and a difference have not been computed). If the method 200 determines that at least one exemplar does remain to be examined in the batch, the method 200 returns to step 206 and proceeds as described above to select and process a next exemplar.

Alternatively, if the method 200 determines in step 212 that there are no exemplars remaining to be examined in the batch, the method 200 proceeds to step 214 and adjusts the (initialized) distance metric and the (initialized) function approximator in accordance with the set of differences $\{(y_i - \hat{y}_i)\}$ for all exemplars i in the batch. These adjustments reduce a given error measure on the batch of exemplars.

In step 216, the method 200 determines whether there are any unexamined batches remaining in the training set of exemplars (i.e., any batches for whom the distance metric and function approximator have not been adjusted). If the method 200 concludes in step 216 that at least one unexamined batch remains, the method 200 returns to step 204 and proceeds as described above to select and process a next batch.

Alternatively, if the method 200 concludes in step 216 that no unexamined batches remain, the method 200 terminates in step 218.

In one embodiment, adjustments made to the distance metric and to the function approximator (e.g., in accordance with step 214 of the method 200) respect one or more hard or soft constraints on allowable adjustments. For example, in the case where the distance metric D( ) computes a Mahalanobis distance, a constraint may be imposed that dictates that the rank of the Mahalanobis matrix may not exceed a specified upper bound. Likewise, the constraints may also embody well-known statistical methods (e.g., "regularization" methods) aimed at reducing the occurrence of overfitting, as described in further detail below.

In one embodiment, if the dependence of the function approximator output ŷ on the distance metric D( ) or on tunable parameters or structure θ is differentiable, the adjustments are computed in accordance with a standard Gradient-Descent technique (e.g., as described by D. E. Rumelhart et al. in "Parallel Distributed Processing", Vols. 1 and 2, Cambridge, Mass.: MIT Press, 1986, which is herein incorporated by reference in its entirety) applied to a quadratic error measure $\Sigma_i(y_i-\hat{y}_i)^2$ summed over all exemplars in the batch. For example, when adjusting the elements $L_{jk}$ of a linear transformation matrix L used in computing a Mahalanobis distance, the adjustment $\Delta L_{jk}$ would be computed as:

$$\Delta L_{jk} = -\varepsilon \frac{\partial}{\partial L_{jk}} \sum_i (y_i - \hat{y}_i)^2 \quad \text{(EQN. 7)}$$

where $\varepsilon$ is a small constant.

In an alternative embodiment, if the dependence of the function approximator output ŷ on the distance metric D( ) or on tunable parameters or structure θ is not differentiable, the adjustments to the distance metric or to the tunable parameters or structure are computed in accordance with a standard Derivative-Free Optimization procedure (e.g., hill climbing, simulated annealing or the like).

In other embodiments, other standard error measures (e.g., cross-entropy, hinge-loss error and the like) and/or other standard optimization techniques (e.g., conjugate-gradient, quasi-Newton, second-order, convex optimization and the like) are implemented to compute adjustments to the distance metric and/or to the tunable parameters or structure. Furthermore, the training sweep methodology implemented in accordance with the present invention may incorporate any one or more of a number of well-known statistical methodologies in order to reduce the occurrence of overfitting. For example, a variety of methods for "regularization", such as penalizing learning parameters of large absolute magnitude, may be applied to the adjustments computed for the distance metric D( ) or the tunable parameters or structure θ. Additionally, the criterion for termination of training may incorporate principles aimed at reducing overfitting, as described above with respect to step 112 of the method 100. In further embodiments, the training sweep methodology may additionally incorporate established methods for "semi-supervised learning" (e.g., minimum entropy regularization), which permit effective training on datasets containing one or more unlabeled exemplars (i.e., input patterns without associated target values).

Figure 3:
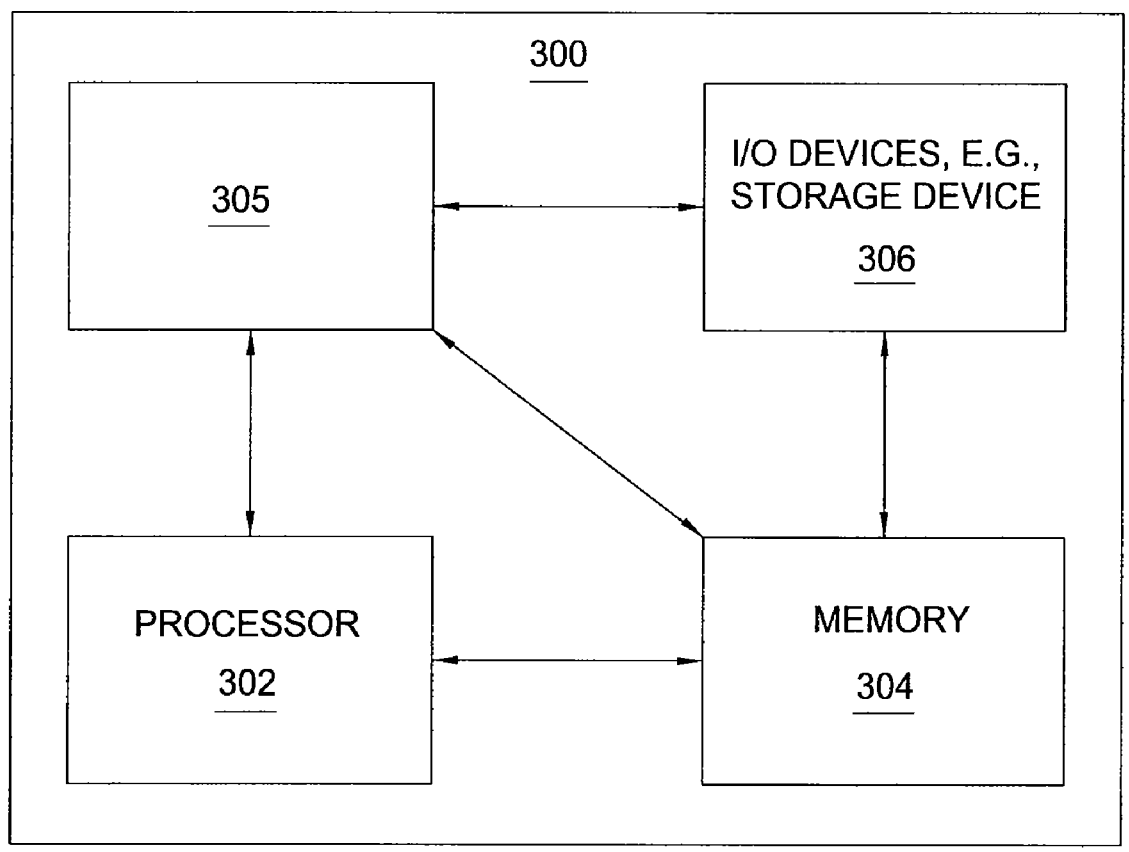
FIG. 3 is a high level block diagram of the regression modeling method that is implemented using a general purpose computing device.

FIG. 3 is a high level block diagram of the regression modeling method that is implemented using a general purpose computing device 300. In one embodiment, a general purpose computing device 300 includes a processor 302, a memory 304, a regression modeling module 305 and various input/output (I/O) devices 306 such as a display, a keyboard, a mouse, a modem, and the like. In one embodiment, at least one I/O device is a storage device (e.g., a disk drive, an optical disk drive, a floppy disk drive). It should be understood that the regression modeling module 305 can be implemented as a physical device or subsystem that is coupled to a processor through a communication channel.

Alternatively, the regression modeling module 305 can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Thus, in one embodiment, the regression modeling module 305 for performing nonlinear regression described herein with reference to the preceding Figures can be stored on a computer readable medium or carrier (e.g., RAM, magnetic or optical drive or diskette, and the like).

Thus, the present invention represents a significant advancement in the field of data analysis. Embodiments of the present invention simultaneously learn a regression-relevant distance metric (between points in an input space) and a distance-based function approximator, which enables application of sophisticated linear or nonlinear dimensionality reduction techniques, thereby addressing the curse of dimensionality. Embodiments of the present invention are broadly useful for purposes of estimation, prediction and control throughout many areas of science and engineering, including, but not limited to, systems management, medical science, pharmacology, bioinformatics, marine, geophysical and atmospheric sciences, financial and economic modeling and consumer/customer modeling.

While foregoing is directed to the preferred embodiment of the present invention, other and further embodiments of the invention may be devised without departing from the basic scope thereof, and the scope thereof is determined by the claims that follow.

The invention claimed is:

1. A method for generating a repression model, given a set of one or more exemplars, the method using a processor to perform steps comprising:
   receiving the set of one or more exemplars, where at least two of the one or more exemplars comprise an input pattern and at least one of the one or more exemplars comprises a target value associated with the input pattern;
   initializing a distance metric, where the distance metric computes a distance between pairs of input patterns;
   initializing a function approximator;
   adjusting the distance metric such that an accuracy measure of the function approximator on the set of one or more exemplars is improved; and
   outputting at least one of the adjusted distance metric and the function approximator to an application.

2. The method of claim 1, wherein the application relates to at least one of: systems management, medical science, pharmacology, bioinformatics, marine science, geophysical science, atmospheric science, financial modeling, economic modeling or consumer modeling.

3. A computer readable storage medium containing an executable program for generating a regression model, given a set of one or more exemplars, where the program performs the steps of:
receiving the set of one or more exemplars, where at least two of the one or more exemplars comprise an input pattern and at least one of the one or more exemplars comprises a target value associated with the input pattern;
initializing a distance metric, where the distance metric computes a distance between pairs of input patterns;
initializing a function approximator;
adjusting the distance metric such that an accuracy measure of the function approximator on the set of one or more exemplars is improved; and
outputting at least one of the adjusted distance metric and the function approximator to an application.

4. The computer readable storage medium of claim 3, wherein the application relates to at least one of: systems management, medical science, pharmacology, bioinformatics, marine science, geophysical science, atmospheric science, financial modeling, economic modeling or consumer modeling.

5. A system for data generating a regression model, given a set of one or more exemplars, comprising:
one or more input/output devices configured for receiving the set of one or more exemplars, where at least two of the one or more exemplars comprise an input pattern and at least one of the one or more exemplars comprises a target value associated with the input pattern; and
a regression modeling module configured for:
initializing a distance metric, where the distance metric computes a distance between pairs of input patterns;
initializing a function approximator; and
adjusting the distance metric such that an accuracy measure of the function approximator on the set of one or more exemplars is improved,
wherein the one or more input/output devices are further configured for outputting at least one of the adjusted distance metric and the function approximator to an application.

6. The method of claim 1, wherein the distance metric takes the form of a Mahalanobis distance.

7. The method of claim 6, wherein initializing the distance metric comprises:
setting initial values for one or more elements in a positive semi-definite matrix.

8. The method of claim 7, wherein the setting comprises:
setting the one or more elements to random values.

9. The method of claim 7, wherein the setting comprises:
setting the one or more elements to values that correspond to an identity matrix.

10. The method of claim 1, wherein the function approximator is governed by a set of distances between the input pattern and a set of one or more reference points.

11. The method of claim 10, wherein initializing the function approximator comprises:
setting a number of the one or more reference points; and
setting locations for the one or more reference points.

12. The method of claim 10, wherein initializing the function approximator comprises:
setting one or more adjustable parameters to initial values.

13. The method of claim 1, wherein the adjusting comprises:
performing one or more training sweeps through the set of one or more exemplars to produce a trained distance metric and a trained function approximator.

14. The method of claim 13, wherein performing a training sweep comprises:
dividing the set of one or more exemplars into one or more batches, each of the one or more batches comprising one or more of the one or more exemplars;
computing for each exemplar in a given batch a difference between a function approximator estimated value and a target value associated with the exemplar; and
adjusting the distance metric and the function approximator in accordance with a set comprising a difference between the function approximator estimated value and the target value for each of the exemplars in the given batch.

15. The method of claim 14, wherein adjusting the distance metric and the function approximator comprises respecting one or more constraints on allowable adjustments.

16. The method of claim 14, wherein adjusting the distance metric and the function approximator is performed in accordance with at least one of: a gradient-descent technique, a second-order technique, or a derivative-free optimization procedure.

17. The method of claim 13, further comprising:
generating a reduction mapping in accordance with the trained distance metric and the set of one or more exemplars; and
applying the reduction mapping to the set of one or more exemplars to produce a lower-dimensionality set of one or more exemplars.

18. The method of claim 17, further comprising:
generating a new regression model in accordance with the lower-dimensionality set of one or more exemplars, the new regression model estimating a target value for a general reduced input vector.

19. The method of claim 17, further comprising:
plotting or visualizing the lower-dimensionality set of one or more exemplars in a manner that facilitates interpretation, analysis or understanding of the original set of one or more exemplars by a human data analyst.

20. The method of claim 1, wherein the application performs at least one of: estimation, prediction or control.

21. The computer readable storage medium of claim 3, wherein the distance metric takes the form of a Mahalanobis distance.

22. The computer readable storage medium of claim 21, wherein initializing the distance metric comprises:
setting initial values for one or more elements in a positive semi-definite matrix.

23. The computer readable storage medium of claim 22, wherein the setting comprises:
setting the one or more elements to random values.

24. The computer readable storage medium of claim 22, wherein the setting comprises:
setting the one or more elements to values that correspond to an identity matrix.

25. The computer readable storage medium of claim 3, wherein the function approximator is governed by a set of distances between the input pattern and a set of one or more reference points.

26. The computer readable storage medium of claim 25, wherein initializing the function approximator comprises:
setting a number of the one or more reference points; and
setting locations for the one or more reference points.

27. The computer readable storage medium of claim 25, wherein initializing the function approximator comprises:
   setting one or more adjustable parameters to initial values.

28. The computer readable storage medium of claim 3, wherein the adjusting comprises:
   performing one or more training sweeps through the set of one or more exemplars to produce a trained distance metric and a trained function approximator.

29. The computer readable storage medium of claim 28, wherein performing a training sweep comprises:
   dividing the set of one or more exemplars into one or more batches, each of the one or more batches comprising one or more of the one or more exemplars;
   computing for each exemplar in a given batch a difference between a function approximator estimated value and a target value associated with the exemplar; and
   adjusting the distance metric and the function approximator in accordance with a set comprising a difference between the function approximator estimated value and the target value for each of the exemplars in the given batch.

30. The computer readable storage medium of claim 29, wherein adjusting the distance metric and the function approximator comprises respecting one or more constraints on allowable adjustments.

31. The computer readable storage medium of claim 29, wherein adjusting the distance metric and the function approximator is performed in accordance with at least one of: a gradient-descent technique, a second-order technique or a derivative-free optimization procedure.

32. The computer readable storage medium of claim 28, further comprising:
   generating a reduction mapping in accordance with the trained distance metric and the set of one or more exemplars; and
   applying the reduction mapping to the set of one or more exemplars to produce a lower-dimensionality set of one or more exemplars.

33. The computer readable storage medium of claim 32, further comprising:
   generating a new regression model in accordance with the lower-dimensionality set of one or more exemplars, the new regression model estimating a target value for a general reduced input vector.

34. The computer readable storage medium of claim 33, further comprising:
   plotting or visualizing the lower-dimensionality set of one or more exemplars in a manner that facilitates interpretation, analysis or understanding of the original set of one or more exemplars by a human data analyst.

35. The computer readable storage medium of claim 3, wherein the application performs at least one of: estimation, prediction or control.

* * * * *